March 15, 1932. F. G. HEHR 1,849,086
AIR COOLED CYLINDER FOR INTERNAL COMBUSTION ENGINES
Filed Aug. 3, 1929   2 Sheets-Sheet 1
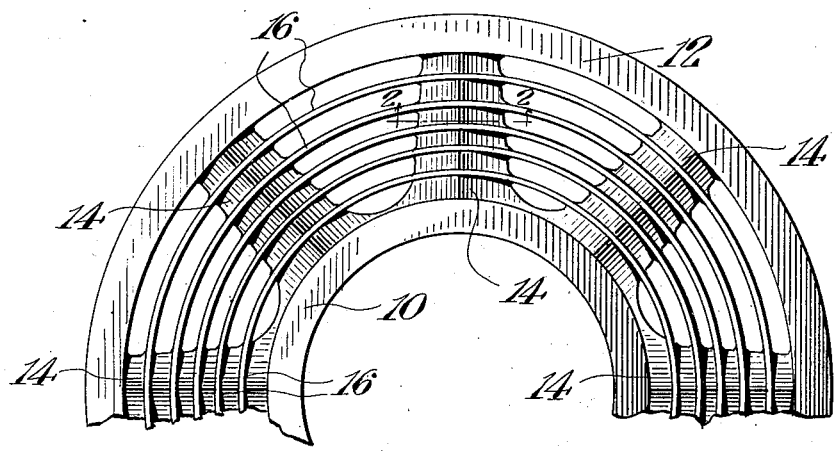
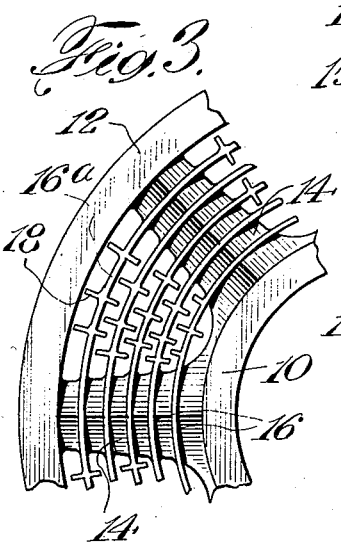
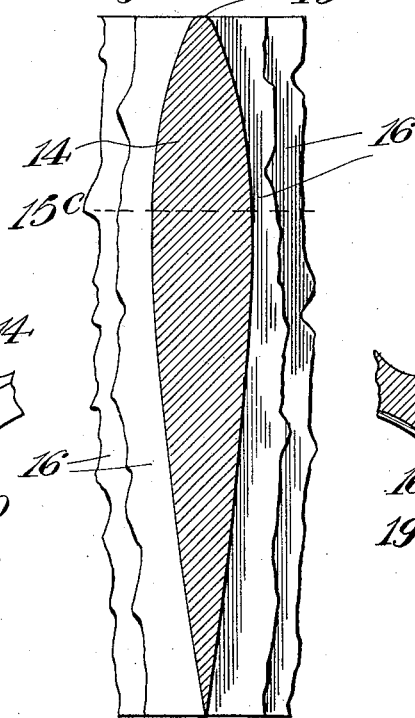
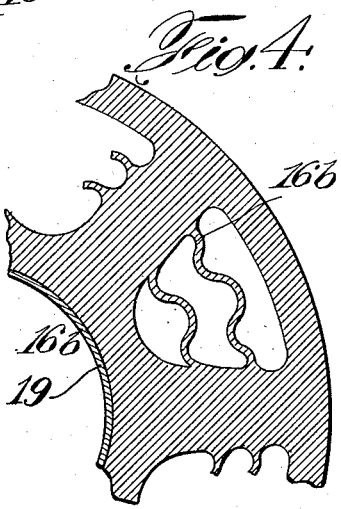
INVENTOR
Frederick G. Hehr
BY
Townsend & Decker
ATTORNEYS

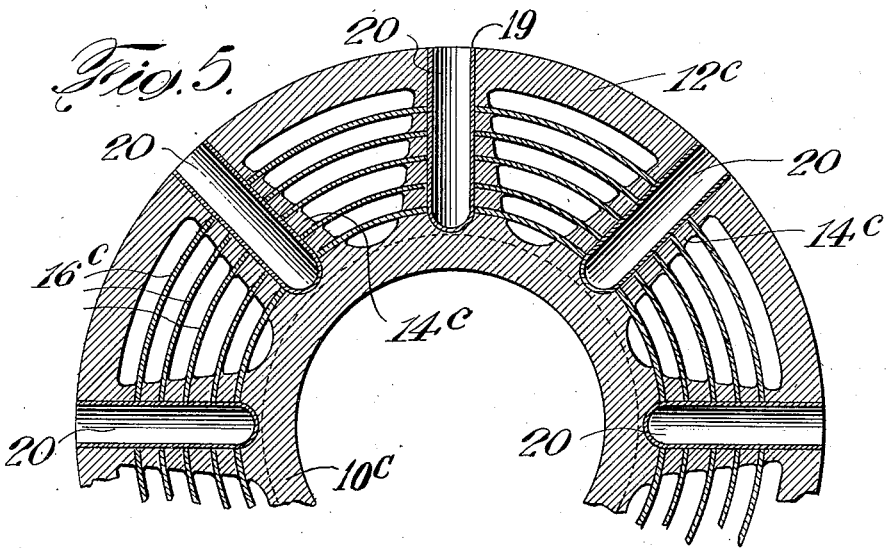
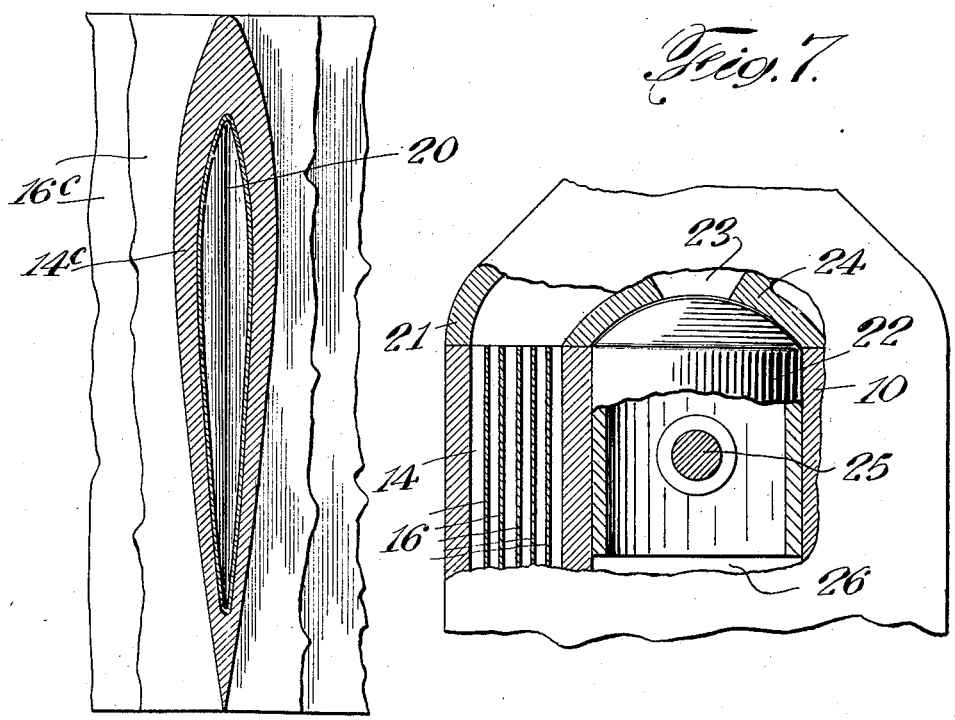

Patented Mar. 15, 1932

1,849,086

UNITED STATES PATENT OFFICE

FREDERICK G. HEHR, OF NEW YORK, N. Y., ASSIGNOR TO AEROL ENGINE CORPORATION, OF NEW YORK, N. Y., A CORPORATION OF NEW YORK

AIR-COOLED CYLINDER FOR INTERNAL COMBUSTION ENGINES

Application filed August 3, 1929. Serial No. 383,228.

This invention relates to improvements in cooling devices for internal combustion engines.

It is a primary object of the invention to provide an improved cooling apparatus for air-cooled engine cylinders which will increase the effectiveness of the cooling system.

The above and other objects will appear more fully from the following description when considered in connection with the drawings, in which:

Fig. 1 is an elevational view of one form of my invention, parts being broken away.

Fig. 2 is a vertical sectional view taken substantially on the line 2—2 of Fig. 1 and illustrating a solid form of rib which may be employed.

Fig. 3 is a fragmentary view similar to Fig. 1 showing a modification of the cooling fins of Fig. 1.

Fig. 4 is an enlarged transverse sectional view showing a still different form which my invention may assume.

Fig. 5 is a transverse sectional view through one of the cylinders showing a further modification of the invention.

Fig. 6 is a vertical sectional view through one of the cooling fins of Fig. 5 illustrating a hollow cooling fin which may be employed.

Fig. 7 is a part sectional view showing the relation of my invention to a complete internal combustion engine cylinder and piston.

The present invention is shown as applied to an internal combustion engine of the in-line type wherein each cylinder is separately constructed and cooled. The cylinder proper is shown at 10, this cylinder being mounted on the engine block in any usual or desired manner and to receive the piston within the same in the usual manner. The cylinder 10 is surrounded by an outer casing 12 connected to the cylinder by means of a series of radial ribs 14. The ribs 14 and casing 12 are formed of a metal having relatively high conductivity for example copper or aluminum or their alloys.

The radial ribs 14 are of general fish shape or stream formation in cross section as shown particularly in Fig. 2. The upper end of these ribs is thus formed with a blunt point as at 15a and the lower end is reduced to a point as at 15b, the largest portion of the ribs being approximately on the line 15c which is slightly beneath the head of the cylinder. My experience indicates that the portion of the cylinder just beneath the cylinder head and at about the highest point reached by the upper connecting rod bearing requires the greatest cooling effect.

It will be observed that with the series of stream line connecting ribs 14 constructed and arranged as shown and described herein the air flow downwardly past the ribs will result in a more rapid air flow past the most critical portion of the cylinders, that is, at the points 15c. This is due to the greater thickness of the ribs 14 at this point. The air flow gradually decreases substantially in inverse proportion to the heat of the cylinder as the air passes downwardly along the cylinders. The more rapid air flow thus results in more effective heat absorption on the section of the cylinder where the ribs 14 are the widest.

In order to further dissipate the heat of the cylinder each of the ribs 14 is preferably provided with a projecting cooling fin. In Fig. 1 these fins are shown at 16 wherein a series of cylindrical fins are cast into the ribs 14 and connected from one to the other thus providing relatively small closed air passages for the cooling fluid (air).

In Fig. 3 I have shown a slightly modified form of the invention. The construction disclosed in this figure is identical with that shown in Fig. 1 except that the fins 16a are provided with additional projecting lugs 18 for increasing the surface of the fins and to increase the effectiveness of the system.

In Fig. 4 the cooling fins 16b are shown as tortuous, it being understood that the same may comprise gradually curved zigzag fins formed of a metal having relatively high conducting capacity or that the same may be angular or otherwise formed of a tortuous construction.

The ribs 14, outer casing 12 and fins 16, 16a and 16b are preferably formed in intimate contact in order to provide for effective heat transmission and dissipation. This may be accomplished by molding or casting the cylinder 10, outer casing 12, ribs 14 and fins 16, 16a, etc. out of the same metal, for example, beryllium or an aluminum alloy as shown in Fig. 4 or the outer casing, ribs and fins may be cast about the pre-formed cast iron cylinder 10 as shown. The preferred method, however, is to cast the ribs 14 either with the cylinder 10 or around the pre-formed cylinder 10 and into and between the concentric pre-formed copper or brass tubular fins 16 as shown in Figs. 1 and 5 (referred to below). The outer casing may be cast with the ribs 14 or it may be merely one of the pre-formed cylindrical fins 16. Where the cylinder is molded or cast with the ribs 14 a thin metallic insert may be forced into the interior of the cylinder and machined down to form the wearing surface of the cylinder as shown at 19 in Fig. 4 the insert 19 being applicable to any form of my invention.

In Figs. 5 and 6 the construction is substantially the same as in the first form of the invention except that a certain portion of the metal is removed from the outer casing 12c and from the connecting ribs 14c. This provides a cavity 20 in each of the connecting ribs thus requiring the use of less metal and assisting in the dissipation of the heat of the cylinder by increasing the exposed surface of the same. The exterior surfaces of the ribs 14c are of fish shape or streamline formation, the same as in the first form of the invention and include the widest portions near but beneath the upper end of the cylinder.

In the form of the invention shown in Figs. 5 and 6 the fins 16c are cut away to receive the interliners 19 for pockets 20. The ribs 14c and casing 12c are then cast around the cylinder 10c and around and between the fins 16c and interliners 19 to complete the construction shown.

The invention is shown as applied to a Diesel engine including the casing 21 for enclosing the upper portion of the piston 22 and cylinder 10, the casing 21 having suitable cooling devices (not shown) for maintaining the cylinder head 24 and combustion chamber 23 at the proper temperature. The piston includes the usual pitman shaft 25, which in its upper position reaches substantially the point 15c referred to in connection with Fig. 2.

With a construction as herein shown and described in various forms the cylinder proper is surrounded by a series of cooling ribs and fins and an enclosing outer casing forming a complete unit. The draft of cooling air which passes longitudinally along the cylinder is subjected to the least possible air resistance due to the streamline formation of the connecting ribs and the thinness of the circumferential fins 16, 16a, etc. The flow of air through the cooling portion of the mechanism attains its greatest velocity substantially at the point 15c, shown in Fig. 2, due to the fact that the greatest thickness of the ribs 14 is at this point. The increased air flow at this point serves to absorb in a more effective manner the heat from the cylinder than with cooling devices as heretofore constructed. Furthermore the increased thickness of the rib 14 on the line 15c (Fig. 2) conducts the heat from the cylinder 10 more effectively at this point and thus further prevents overheating of this portion of the cylinder.

Having now described my invention, I claim:

1. In an internal combustion engine, a cylinder, radial ribs formed of heat conducting material intimately connected with the outer surface of said cylinder, a casing encircling said cylinder and ribs and intimately connected to the latter and cooling fins extending from one rib to another and positioned between said cylinder and said casing.

2. In an internal combustion engine, a cylinder, heat absorbing ribs intimately associated with said cylinder and extending longitudinally of the same, said ribs being formed with reduced terminal portions and relatively enlarged intermediate portions.

3. In an air-cooled engine, a cylinder, an outer casing and a plurality of concentrically arranged cylindrical fins encircling said cylinder and a series of heat conducting ribs of general fish-shape intimately associated with said cylinder and extending lengthwise of the same between said cylinder and said casing.

4. In an air-cooled engine, a cylinder, an outer casing encircling the same, a series of heat conducting ribs of general fish-shape intimately associated with said cylinder and extending lengthwise of the same between said cylinder and said casing and a series of fins extending from said ribs into the space between said cylinder and said casing.

5. In an air-cooled engine, a cylinder, an outer casing encircling the same, a series of heat conducting ribs of general fish-shape intimately associated with said cylinder and extending lengthwise of the same between said cylinder and said casing and concentric circumferentially arranged projecting cooling elements associated with said ribs.

6. In an internal combustion engine, a cylinder, means for dissipating the heat formed within said cylinder, said means including a series of ribs of general fish-shape extending outwardly from said cylinder and a series of concentric fins of cylindrical form intimately associated in heat conducting relation to said ribs.

7. In an internal combustion engine, a cylinder, means for dissipating the heat formed within said cylinder, said means including a series of ribs of general fish-shape extending longitudinally along said cylinder and intimately associated in heat conducting relation to the same, said ribs having their greatest thickness at points near the upper end of the cylinder and concentric cylindrical metallic members encircling said cylinder and extending between said ribs, the outer cylindrical member constituting an enclosing casing for the cylinder and ribs.

8. In an internal combustion engine, a cylinder, means for dissipating the heat formed within said cylinder, said means including a series of hollow ribs of general fish-shape extending outwardly from and longitudinally along said cylinder and intimately associated in heat conducting relation to the same.

9. In an air-cooled engine, a cylinder, an outer casing encircling the same, a series of heat conducting ribs of general fish-shape intimately associated with said cylinder and extending lengthwise of the same between said cylinder and said casing and a series of cylindrical fins connecting successive ribs and positioned between said cylinder and said casing.

10. In an air cooled engine, an integral unit comprising a power cylinder, radial walls radiating outwardly from the same and a series of spaced cooling fins encircling said cylinder and extending between said radial walls.

11. In an air cooled engine, an integral unit comprising a power cylinder, radial walls radiating outwardly from the same, a series of spaced cooling fins encircling said cylinder and extending between said radial walls and a metallic wearing insert forced into the interior of said cylinder.

12. In an air-cooled engine, a cylinder, a series of pre-formed cooling fins and a series of radial fish shaped walls of hollow structure cast or molded into and between said fins and cylinder, the interior of said walls opening outwardly at the outer edges thereof.

Signed at New York, in the county of New York and State of New York, this 1st day of August, A. D. 1929.

FREDERICK G. HEHR.